United States Patent
Mallette

(10) Patent No.: US 12,239,239 B2
(45) Date of Patent: Mar. 4, 2025

(54) INFLATABLE BLADDER

(71) Applicant: Gulfstream Aerospace Corporation, Savannah, GA (US)

(72) Inventor: Jeremiah Mallette, Savannah, GA (US)

(73) Assignee: GULFSTREAM AEROSPACE CORPORATION, Savannah, GA (US)

( * ) Notice: Subject to any disclaimer, the term of this patent is extended or adjusted under 35 U.S.C. 154(b) by 339 days.

(21) Appl. No.: 17/658,736

(22) Filed: Apr. 11, 2022

(65) Prior Publication Data

US 2023/0320488 A1    Oct. 12, 2023

(51) Int. Cl.
*A47C 7/14* (2006.01)

(52) U.S. Cl.
CPC .............. *A47C 7/142* (2018.08); *A47C 7/144* (2018.08)

(58) Field of Classification Search
CPC .......... A47C 7/142; A47C 7/144; B60N 2/914
USPC ..................................................... 297/284.3
See application file for complete search history.

(56) References Cited

U.S. PATENT DOCUMENTS

| | | | | |
|---|---|---|---|---|
| 199,535 | A * | 1/1878 | Granger | A47C 3/029 297/452.5 |
| 3,363,941 | A * | 1/1968 | Wierwille | A47C 4/54 297/284.3 |
| 4,059,909 | A * | 11/1977 | Kron | A47C 7/467 297/180.12 |
| 4,969,684 | A * | 11/1990 | Zarotti | A47C 27/082 297/284.3 |
| 5,263,765 | A * | 11/1993 | Nagashima | B60N 2/0244 297/284.6 |
| 5,419,612 | A * | 5/1995 | Rassekhi | B62J 1/26 297/284.3 |
| 5,904,219 | A * | 5/1999 | Anahid | A61G 5/1043 177/144 |
| 6,065,167 | A * | 5/2000 | Gancy | A47C 27/18 5/713 |
| 9,333,889 | B1 * | 5/2016 | Cloutier | B60N 2/70 |
| D880,215 | S * | 4/2020 | Lisenbee | B68G 7/10 D6/606 |
| 10,696,202 | B2 * | 6/2020 | Sedenka | B60N 2/7017 |
| 10,744,920 | B2 * | 8/2020 | Strumolo | B60N 2/665 |
| 10,765,219 | B1 * | 9/2020 | Cabble | A61H 9/0078 |

(Continued)

FOREIGN PATENT DOCUMENTS

DE     102016004685 A1    11/2016
KR        102013370 B1 *  8/2019

(Continued)

*Primary Examiner* — Jose V Chen
(74) *Attorney, Agent, or Firm* — Lorenz & Kopf, LLP

(57) ABSTRACT

An inflatable bladder includes, but is not limited to, a bladder body having a wall, a longitudinal dimension, and a lateral dimension. The wall defines an interior volume enclosing a fluid. The wall further defines an opening in fluid communication with the interior volume. The bladder body is fluid tight when the opening is closed. The wall is configured to facilitate an expansion of the longitudinal dimension during an ingress of the fluid into the interior volume and a contraction of the longitudinal dimension during an egress of the fluid from the interior volume. The wall is further configured to maintain a constant lateral dimension during the ingress of the fluid into the interior volume and a constant lateral dimension during the egress of the fluid from the interior volume.

19 Claims, 6 Drawing Sheets

(56) References Cited

U.S. PATENT DOCUMENTS

| | | | | |
|---|---|---|---|---|
| 11,028,859 | B2* | 6/2021 | Uno | B60N 2/5657 |
| 11,504,293 | B2* | 11/2022 | Weber | B60N 2/976 |
| 2003/0038517 | A1* | 2/2003 | Moran | B60N 2/914 |
| | | | | 297/284.6 |
| 2006/0049678 | A1* | 3/2006 | Kern | A47C 7/467 |
| | | | | 297/284.3 |
| 2007/0273188 | A1* | 11/2007 | Morrison | A47C 4/54 |
| | | | | 297/284.6 |
| 2007/0277320 | A1* | 12/2007 | Massmann | A47C 4/54 |
| | | | | 5/710 |
| 2009/0099490 | A1* | 4/2009 | Durt | B60N 2/99 |
| | | | | 297/284.3 |
| 2010/0276973 | A1* | 11/2010 | Zenk | B60N 2/0244 |
| | | | | 297/284.3 |
| 2014/0020185 | A1 | 1/2014 | Wang et al. | |
| 2015/0165940 | A1* | 6/2015 | Schnell | B32B 37/0076 |
| | | | | 297/284.3 |
| 2016/0348670 | A1* | 12/2016 | Sakohira | F04B 45/047 |
| 2017/0156519 | A1* | 6/2017 | Cheng | A47C 7/383 |
| 2018/0086238 | A1* | 3/2018 | Onuma | B60N 2/976 |
| 2018/0333325 | A1* | 11/2018 | Inoue | B60N 2/976 |
| 2019/0000247 | A1* | 1/2019 | Ko | B60N 2/7094 |
| 2019/0075932 | A1 | 3/2019 | Yu et al. | |
| 2019/0168651 | A1* | 6/2019 | Buschmann | B60N 2/914 |
| 2019/0183257 | A1* | 6/2019 | Arzanpour | A47C 7/142 |
| 2020/0247296 | A1* | 8/2020 | Wheeler | B60N 2/99 |
| 2020/0253381 | A1* | 8/2020 | Dörfler | A47C 7/20 |
| 2021/0071659 | A1 | 3/2021 | Kim et al. | |
| 2021/0078475 | A1* | 3/2021 | Kurematsu | B60N 2/976 |
| 2021/0170926 | A1* | 6/2021 | Migneco | A61F 7/00 |
| 2021/0261030 | A1* | 8/2021 | Ceglarek | B60N 2/976 |
| 2021/0300224 | A1* | 9/2021 | Tait | B60N 2/56 |
| 2023/0355462 | A1* | 11/2023 | Ghanime | B60N 2/976 |

FOREIGN PATENT DOCUMENTS

| | | | | |
|---|---|---|---|---|
| WO | WO-2014038961 | A1 * | 3/2014 | A47C 27/081 |
| WO | WO-2015002551 | A1 * | 1/2015 | A47C 31/12 |

* cited by examiner

INFLATABLE BLADDER

TECHNICAL FIELD

The present invention relates generally to inflatable structures, and more particularly relates to an inflatable bladder for providing a seat occupant with variable support.

BACKGROUND

Conventional seats that provide occupant-selectable levels of expanding and contracting cushion support typically achieve such varying levels of cushion support using conventional inflatable bladders. A conventional inflatable bladder comprises a circular bladder having an upper circular skin and a lower circular skin coupled together at their respective peripheries to form a pocket therebetween. The two circular skins are coupled together in a manner that renders the conventional inflatable bladder fluid tight, with the exception of a single opening to which a valve or tube or other mechanism may be coupled to control the ingress and egress of a fluid (e.g., air). When deflated, the conventional inflatable bladder forms a flat circular disk. When fluid is introduced into the pocket of the conventional inflatable bladder, the conventional inflatable bladder expands to form a sphere. In other words, the addition of air (or any other fluid) into a conventional inflatable bladder drives the walls of the two discs apart from one another except at their peripheries which are coupled together.

Longitudinally (e.g., vertically), the dimension of the conventional inflatable bladder increases during inflation. Laterally (e.g., horizontally), the dimension of the conventional inflatable bladder decreases during inflation. When the conventional inflatable bladder is deflated, the shape of the conventional inflatable bladder returns to that of a disk. In other words, there is a change in both the longitudinal dimension and the lateral dimension of the conventional inflatable bladder during each inflation and deflation cycle.

The circular configuration of the deflated conventional inflatable bladder has a few undesirable consequences. When employing multiple conventional inflatable bladders in an array (e.g., in a seat back or in a seat bottom), each conventional inflatable bladder must be placed far enough away from its neighbor to accommodate the full circumference of each disk-shaped deflated conventional inflatable bladder. If they were placed any closer together, for example, in an overlapping arrangement, they might interfere with one another during the inflation and deflation cycles. Thus, the circular configuration of conventional inflatable bladders inhibits the ability to densely pack the conventional inflatable bladders together in an array. The inability to densely pack conventional inflatable bladders in a seat support or in a back support may lead to the seat and/or backrest providing less comfort and less support than a seat occupant might prefer.

Additionally, when fully deflated, the two circular skins are pressed up against one another across their entire respective surface areas. In this state, a conventional inflatable bladder has a thickness on the order of one tenth of an inch. Thus, when fully deflated, the conventional inflatable bladder provides virtually no cushioning or support to a seat occupant. This, in turn, requires seat manufacturers to add additional foam to their seats to offset this lack of support. This additional foam adds cost and weight to each seat. Further, foam is a natural insulator. Accordingly, extra foam obstructs the dissipation of body heat emanating from a seat occupant. This, in turn, creates hot spots that can increase a seat occupant's discomfort.

Accordingly, it is desirable to provide an inflatable bladder that addresses the concerns expressed above. Furthermore, other desirable features and characteristics will become apparent from the subsequent summary and detailed description and the appended claims, taken in conjunction with the accompanying drawings and the foregoing technical field and background.

BRIEF SUMMARY

An inflatable air bladder is disclosed herein.

In a first non-limiting embodiment, the inflatable air bladder includes, but is not limited to, a bladder body. The bladder body has a wall. The bladder body has a longitudinal dimension. The bladder body has a lateral dimension. The wall defines an interior volume enclosing a fluid when the inflatable bladder is deflated. The wall further defines an opening that is in fluid communication with the interior volume. The bladder body is fluid tight when the opening is closed. The wall is configured to facilitate an expansion of the longitudinal dimension during an ingress of the fluid into the interior volume and a contraction of the longitudinal dimension during an egress of the fluid from the interior volume. The wall is further configured to maintain a constant lateral dimension during the ingress of the fluid into the interior volume and a constant lateral dimension during the egress of the fluid from the interior volume.

In another non-limiting embodiment, the inflatable air bladder includes, but is not limited to, a bladder body. The bladder body has a wall. The bladder body has a longitudinal dimension. The bladder body has a lateral dimension. The wall defines an interior volume enclosing a fluid when the inflatable bladder is deflated. The wall further defines an opening that is in fluid communication with the interior volume. The bladder body is fluid tight when the opening is closed. The wall is configured to facilitate an expansion of the longitudinal dimension during an ingress of the fluid into the interior volume and a contraction of the longitudinal dimension during an egress of the fluid from the interior volume. The wall is further configured to constrain expansion of the lateral dimension during the ingress of the fluid into the interior volume such that any expansion of the lateral dimension is equal to, or less than, five percent of the expansion of the longitudinal dimension during the ingress of the fluid into the interior volume.

BRIEF DESCRIPTION OF THE DRAWINGS

The present invention will hereinafter be described in conjunction with the following drawing figures, wherein like numerals denote like elements.

DETAILED DESCRIPTION

Figure 1:
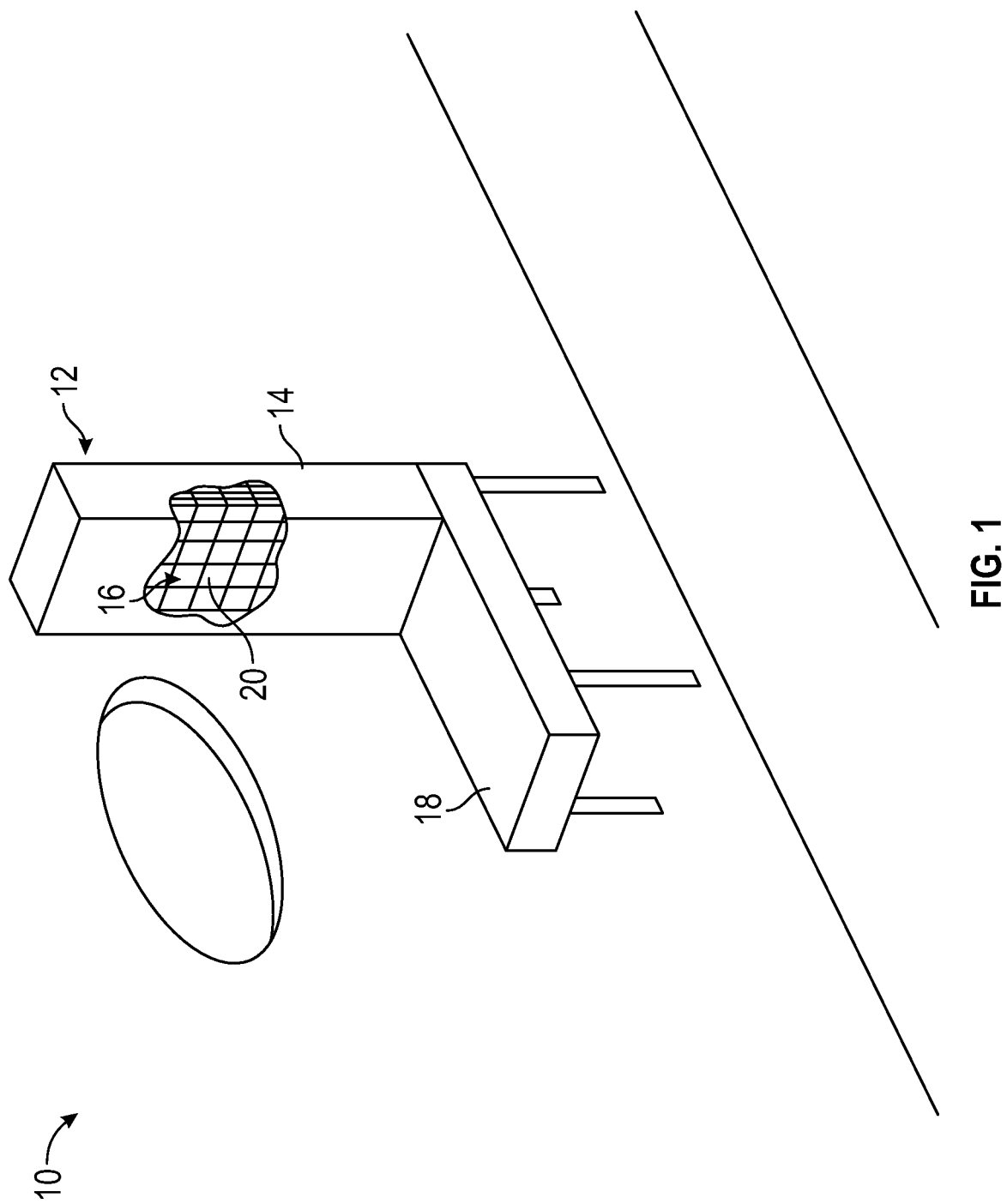
FIG. 1 is a perspective view illustrating a vehicle seat equipped with an array of non-limiting embodiments of inflatable bladders made in accordance with the teachings of the present disclosure.

The following detailed description is merely exemplary in nature and is not intended to limit the invention or the application and uses of the invention. Furthermore, there is no intention to be bound by any theory presented in the preceding background or the following detailed description.

An improved inflatable bladder is disclosed herein. The inflatable bladder of the present disclosure has a non-flat, three-dimensional configuration when the inflatable bladder is in a deflated state as compared with the flat, two-dimensional configuration of the conventional inflatable bladder when the conventional inflatable bladder is in the deflated state. In other words, whereas a conventional inflatable bladder has walls that have opposing internal surfaces that are collapsed against one another when the conventional bladder is deflated, the inflatable bladder of the present disclosure has walls having internal surfaces that remain spaced apart from one another when the inflatable bladder of the present disclosure is deflated. As used herein, the term "deflated" shall mean that the static pressure of a fluid inside the bladder reaches an equilibrium with the ambient pressure of the fluid outside of the bladder as a result of venting the bladder to the ambient environment and then, once the internal and external fluid pressures have equalized, closing off the bladder so that no additional fluid may enter or exit the bladder. As used herein, the term "inflated" shall mean a condition in which the inflatable bladder contains more fluid than it would contain if it were in the deflated state.

In addition, in some non-limiting embodiments, the inflatable bladder of the present disclosure has a generally rectangular configuration when viewed from above. This permits the inflatable bladder of the present disclosure to be packed closer together in an array than is possible with conventional inflatable bladders that have circular configurations.

Further, the inflatable bladder of the present disclosure has one or more expansion joints, convolutions, or other configurations that permit the inflatable bladder to expand in the longitudinal direction when inflated. In addition, the inflatable bladder is configured to restrict the inflatable bladder from expanding in the lateral direction when inflated. For example, and without limitation, the inflatable bladder may be devoid of any expansion joints, convolutions, or other configurations that permit the inflatable bladder to expand in the lateral direction when inflated. This lack of lateral expansion further contributes to the ability to more densely pack the individual inflatable bladders together than conventional inflatable bladders.

An inflatable bladder of the present disclosure can be constructed in any suitable manner that is effective to create a fluid tight structure having the properties described herein. In one non-limiting example, the inflatable bladder may be constructed from composite plies set up in opposing halves of a mold and then brought together in a clamshell fashion by positioning the two haves adjacent one another to form an interior pocket, and then joining the two halves at their respective lips through the use of adhesives, heat treatment, combinations thereof, and/or any other technique that is effective for coupling the two haves together to yield a fluid tight structure.

A greater understanding of the inflatable bladder discussed above may be obtained through a review of the illustrations accompanying this application together with a review of the detailed description that follows.

With respect to FIG. 1, a perspective view is presented illustrating an interior 10 of an aircraft (not shown). Interior 10 includes a seat assembly 12. Seat assembly 12 has been illustrated in a simplified manner, with many seat components and features omitted for ease of illustration and for the purpose of simplifying the concepts conveyed by the present disclosure. It should be understood that in other embodiments, additional features and components of seat assembly 12 may be present without departing from the teachings of the present disclosure. Further, while the context of this discussion is with respect to seats that are disposed in an aircraft, it should be understood that the invention disclosed herein is not limited in its application to use with aircraft. Rather, the invention disclosed herein is suitable for use in any vehicle having a seat that is configured to provide varying amounts of support to a human occupant without departing from the teachings of the present disclosure. Further, the invention disclosed herein is not limited to use with vehicles but rather, it is applicable to every conceivable type of seat that is configured to provide varying levels of support to a human occupant without departing from the teachings of the present disclosure. Furthermore, the teachings disclosed herein are not limited to use with seats, but may be employed in any structure, device, article of furniture, or other apparatus that is configured to provide varying levels of support and/or compression for any conceivable purpose.

With continuing reference to FIG. 1, seat assembly 12 includes a seat back 14 configured to support the back of a human occupant of seat assembly 12. A portion of seat back 14 has been torn away to reveal an array 16 of inflatable bladders 20 disposed beneath an outer surface of seat back 14. Array 16 is configured to provide a variable amount of support to the back of an occupant of seat assembly 12. In the embodiment illustrated in FIG. 1, seat bottom 18 also includes an array 16 (not illustrated) of inflatable bladders 20 to provide a variable amount support to the bottom of an occupant of seat assembly 12. While seat assembly 12 illustrated in FIG. 1 includes an array 16 in both seat back 14 and seat bottom 18, it should be understood that in other embodiments, seat assembly 12 may include only a single array 16 of inflatable bladders 20 in either seat back 14 or seat bottom 18 without departing from the teachings of the present disclosure. In still other embodiments, seat assembly 12 may include three or more arrays 16 without departing from the teachings of the present disclosure.

Figure 2:
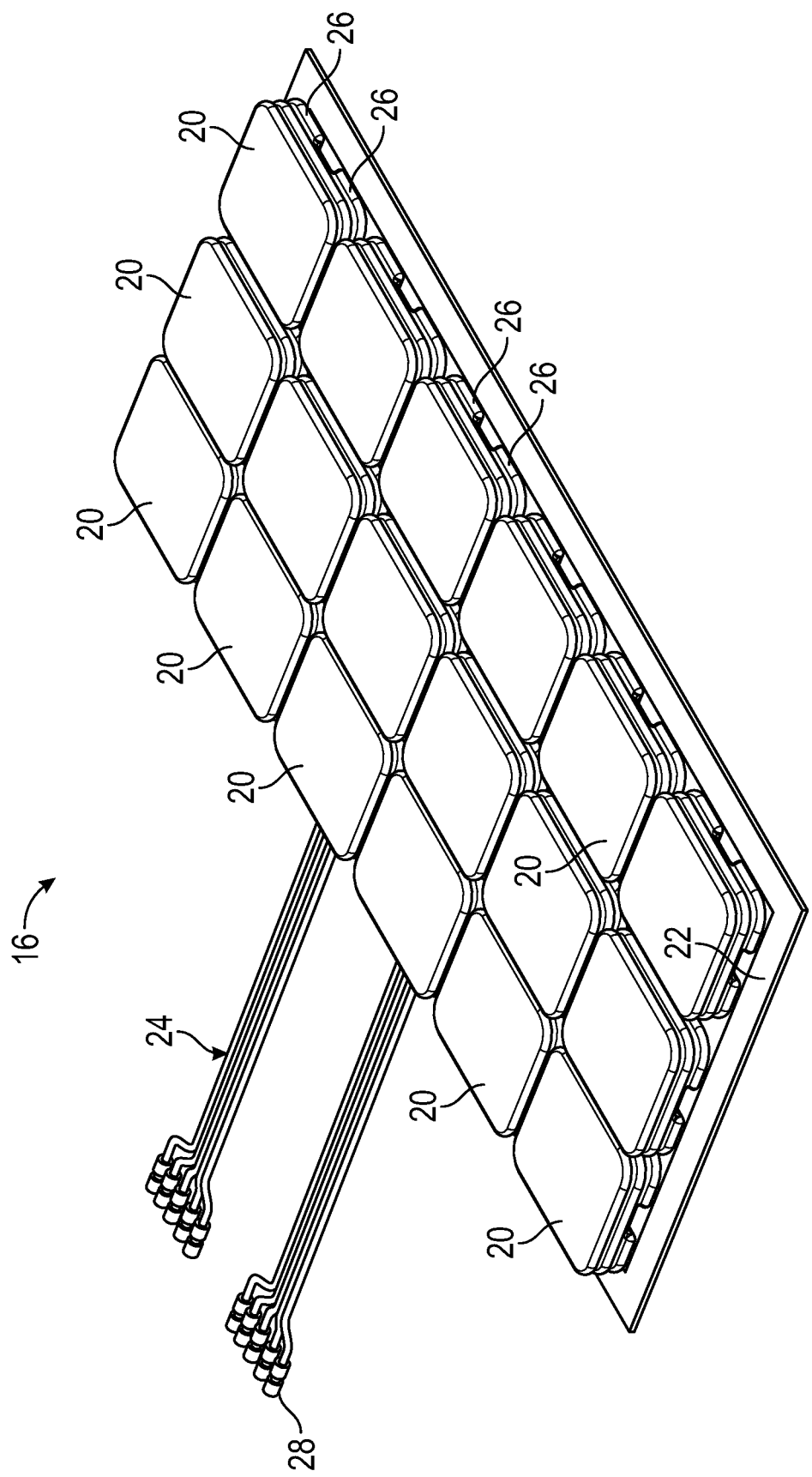
FIG. 2 is a perspective view illustrating an expanded view of the array of FIG. 1.

With continuing reference to FIG. 1, FIG. 2 is a perspective view presenting an expanded illustration of array 16 of inflatable bladders 20. As illustrated in FIG. 2, array 16 includes a total of 18 individual inflatable bladders 20 disposed on a base 22. In other embodiments, the number of inflatable bladders 20 employed in array 16 may vary depending upon the size of each individual inflatable bladder 20 or on the size of the area to be covered by array 16, or by both. Further, although array 16 is illustrated as having a rectangular configuration in FIG. 2, it should be understood that in other embodiments, any suitable configuration that is effective to cover a desired target area may be employed without departing from the teachings of the present disclosure.

As best seen in FIGS. 1 and 2, the plurality of inflatable bladders 20 are positioned close to one another and densely packed together in array 16. Such a densely packed configuration could not be achieved using conventional inflatable bladders having circular configurations and spherical inflation patterns. The ability to position inflatable bladder 20 closer together than would be permitted with conventional inflatable bladders is facilitated by the generally rectangular configuration of each individual inflatable bladder 20. Having generally straight edges around its periphery permits the individual inflatable bladders 20 to be positioned directly adjacent to one another along substantially their entire respective peripheries. The precise geometric configuration of inflatable bladders 20 can be designed to best accommodate each particular application. For example, in some applications, an elongated rectangular configuration may be best suited to provide desirable levels of occupant comfort while in other embodiments, square-shaped inflatable bladders 20 may be best suited to provide desirable levels of occupant comfort. In still other embodiments, inflatable bladders 20 may have complementary shapes (e.g., convex lateral peripheries and concave lateral peripheries) or interlocking configurations (e.g., jigsaw puzzle piece shaped lateral peripheries) without departing from the teachings of the present disclosure.

Figure 5:
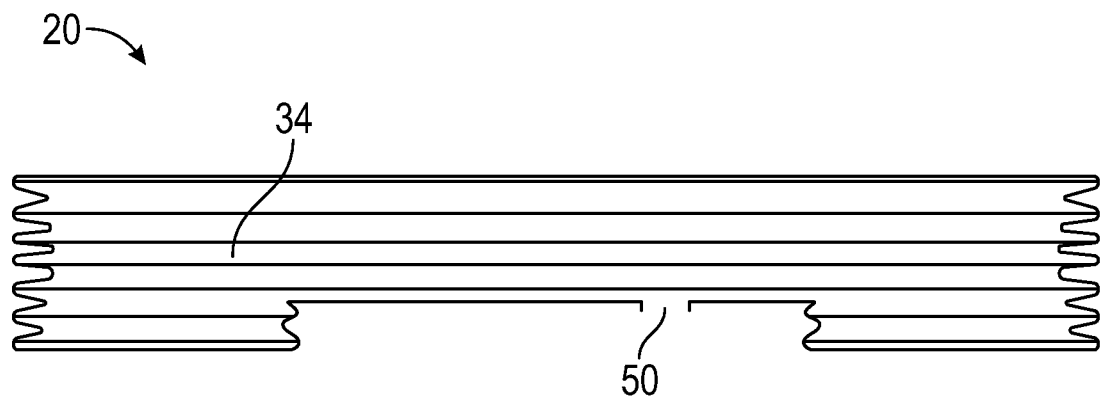
FIG. 5 is a cross-sectional view taken along the line 5-5 of FIG. 3 illustrating the inflatable bladder of FIG. 3.
Figure 7:
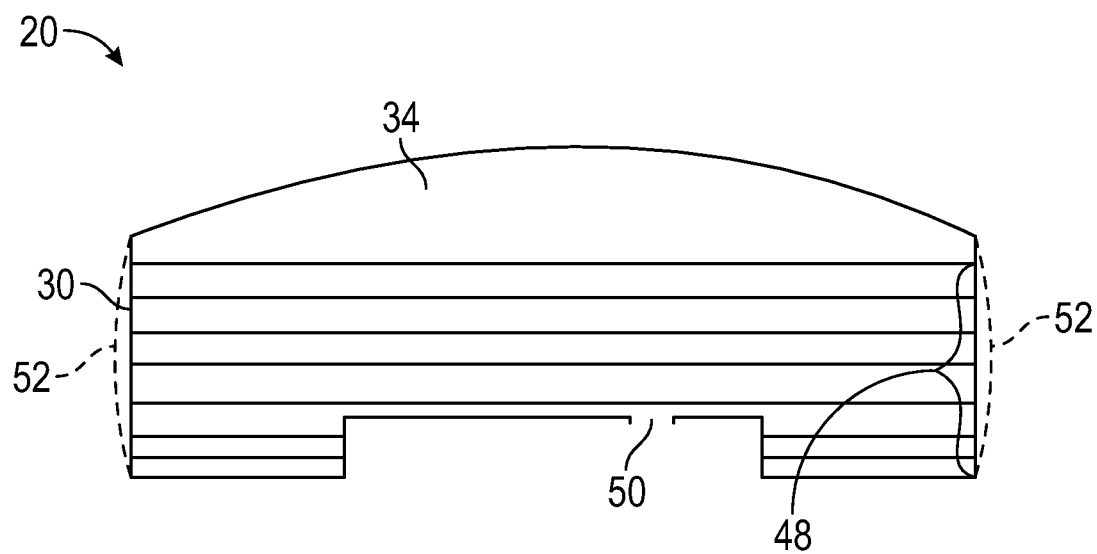
FIG. 7 is a cross-sectional view illustrating the inflatable bladder of FIG. 3 in an in inflated state.

As discussed in greater detail below, each inflatable bladder 20 is configured to contain a fluid (e.g., air) in a fluid-tight manner. Each inflatable bladder 20 is further configured to expand and contract in conjunction with the addition and removal of the fluid from the bladder. In the embodiment illustrated in FIG. 2, each inflatable bladder 20 includes an opening (as best seen in FIGS. 5 and 7) that is configured for coupling to a fluid source, such as a tube or valve. In FIG. 2, a plurality of tubes 24 are arranged to deliver fluid to, and to carry fluid away from, each inflatable bladder 20. To facility the coupling of each tube 24 with each inflatable bladder 20 of array 16, each inflatable bladder 20 is configured to include a plurality of feet 26. Feet 26 stand the primary body of inflatable bladder 20 off of base 22, thereby providing a substantially unobstructed path underneath the primary body for the routing of tubes 24 under inflatable bladders 20. In other embodiments, inflatable bladder 20 may be configured without feet without departing from the teachings of the present disclosure.

Plurality of tubes 24 are coupled with a respective plurality of valves 28. Accordingly, the addition and removal of fluid from each inflatable bladder 20 is controlled by plurality of valves 28. Valves 28 may comprise any suitable valve configured to control the passage of fluid through tubes 24. This arrangement of valves 28, tubes 24, and inflatable bladders 20 permit the selective inflation and deflation of individual inflatable bladders 20 and/or the selective inflation and deflation of groupings of inflatable bladders 20. In the embodiment illustrated in FIG. 2, a total of ten valves 28 and a corresponding total of 10 tubes 24 are illustrated. As set forth above, array 16 includes a total of 18 inflatable bladders 20. Accordingly, some of the tubes 24 are fluidly coupled with multiple inflatable bladders 20. In other embodiments, an equal number of valves 28, tubes 24, and inflatable bladders 20 may be employed without departing from the teachings of the present disclosure.

Figure 3:
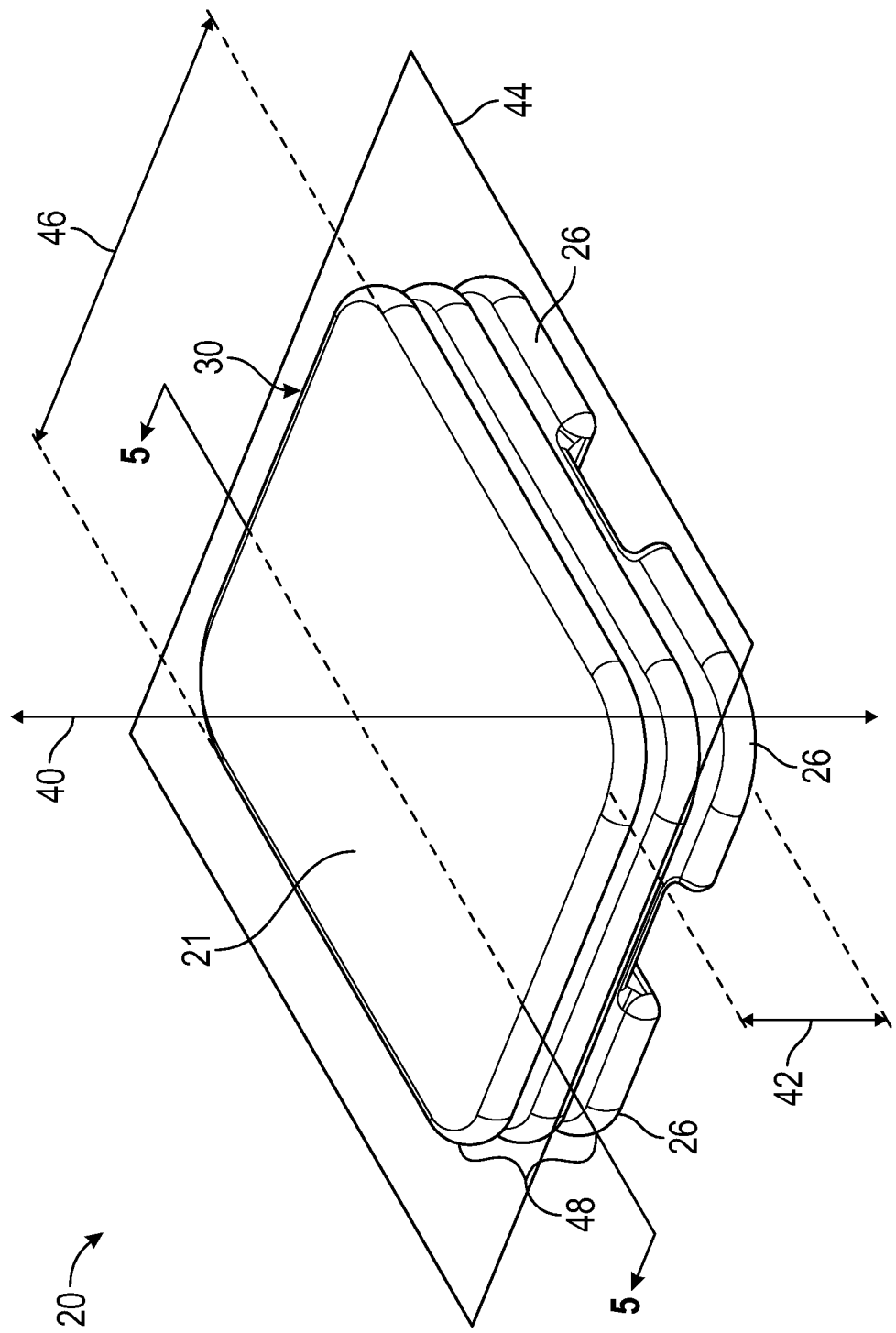
FIG. 3 is a perspective view illustrating an expanded view of a non-limiting embodiment of an inflatable bladder used in the array of FIGS. 1 and 2.
Figure 4:
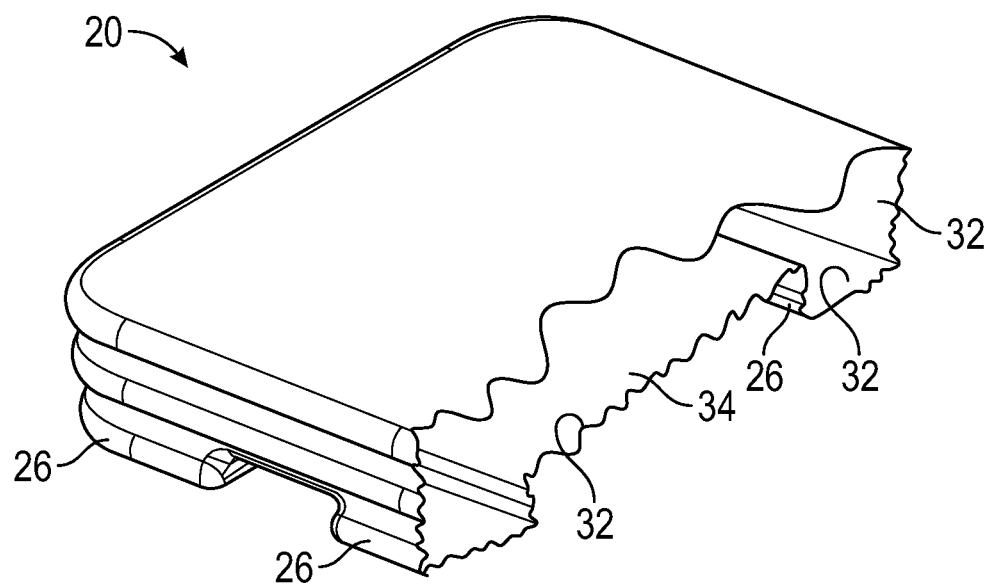
FIG. 4 is a perspective, cut-away view illustrating the inflatable bladder of FIG. 3.

With continuing reference to FIGS. 1-2, FIG. 3 is a perspective view presenting an expanded illustration of an individual inflatable bladder 20 and FIG. 4 is a perspective view presenting a torn-away image of inflatable bladder 20 showing a portion of the interior of inflatable bladder 20. As best seen in FIG. 3, inflatable bladder 20 is a rectangular-box-like structure having downwardly extending feet 26. From overhead, inflatable bladder 20 has a square-shaped upper surface, the square shape having rounded corners. In other embodiment, variations from this configuration may be employed without departing from the teaching of the present disclosure.

In FIGS. 3 and 4, bladder 20 is illustrated in a deflated state. While in the deflated state, an upper surface 21 of inflatable bladder 20 has a flat curvature. In other words, when deflated, upper surface 21 is neither concave nor convex. Inflatable bladder 20 is a fluid-tight structure constructed of a wall 30 extending around, and forming, the entire structure of inflatable bladder 20. Wall 30 includes vertical sides, upper surface 21 and a lower surface which, in the illustrated embodiment, forms a generally rectangular, hollow box. Wall 30 has an internal surface 32 that is configured to form an internal pocket 34. As best seen in FIG. 4, all opposing portions of internal surface 32 are spaced apart from one another when inflatable bladder 20 is deflated. In other words, unlike conventional inflatable bladders where the opposing walls collapse against one another when deflated to form an essentially two-dimensional disk structure having an insignificant height or thickness, inflatable bladder 20 maintains a three-dimensional shape having substantial thickness in the longitudinal direction. This is made possible, in part, due to the rectangular box-like configuration of inflatable bladder 20. This is also made possible, in part, due to the materials that is used to construct inflatable bladder 20. An example of a material which that is suitable for use in the construction of inflatable bladder 20 comprises a fiberglass fabric that is infused with fire rated silicon. It should be understood that many other materials may be employed as well. As a result of inflatable bladder 20 retaining its three-dimensional configuration even when deflated, it remains able to provide cushioning support in the longitudinal direction, especially when the opening to pocket 34, discussed below, is closed and further egress of air as a result of compression is inhibited.

With continuing reference to FIGS. 1-4, as seen in FIG. 4, a longitudinal axis 40 extends longitudinally through a center of inflatable bladder 20 and inflatable bladder 20 has a longitudinal dimension 42. An imaginary plane 44 extends laterally through inflatable bladder 20 and inflatable bladder 20 has a lateral dimension 46. Incorporated into wall 30 and extending around an entire lateral periphery of inflatable bladder 20 are convolutions 48. Convolutions 48 comprise reciprocating folds in the material comprising wall 30. In the illustrated embodiment, convolutions 48 will unfold in an accordion-like manner as inflatable bladder 20 is inflated, permitting inflatable bladder 20 to elongate in the longitudinal direction. Said another way, convolutions 48 permit and facilitate the longitudinal expansion of inflatable bladder 20 when fluid is added to pocket 34. By contrast, inflatable bladder 20 is devoid of convolutions, expansion joints, or any other mechanism that permits expansion along lateral plane 44. Accordingly, as fluid as added to pocket 34, convolutions 48 will facilitate expansion of inflatable bladder 20 in the longitudinal direction and the absence of corresponding convolutions in the lateral direction will inhibit the expansion of inflatable bladder 20 in the lateral direction.

In the embodiment illustrated in FIG. 4, the portion of inflatable bladder 20 that has been torn away permits viewing the internal structure of inflatable bladder 20, and in particular, the internal structure of feet 26. In the illustrated embodiment, feet 26 are hollow structures that are in fluid communication with the remainder of pocket 34. In other embodiments, feet 26 may comprise solid structures that are attached to an underside of inflatable bladder 20 without departing from the teachings of the present disclosure. In still other embodiments, feet 26 may comprise hollow structures that are attached to inflatable body 20 and that are fluidly disconnected from pocket 34 without departing from the teachings of the present disclosure. Other configurations of feet 26 are also possible and may be employed without departing from the teachings of the present disclosure.

With continuing reference to FIGS. 1-4, FIG. 5 is a cross-sectional view illustrating a cross-section of inflatable bladder 20 taken along the line 5-5 of FIG. 3. In FIG. 5, convolutions 48 are clearly visible. As illustrated, convolutions 48 comprise reciprocating folds in the skin of wall 30. Also visible in FIG. 5 is opening 50. Opening 50 comprises the sole passageway into and out of pocket 34. In the illustrated embodiment, opening 50 is configured to receive tube 24. When tube 24 is coupled with opening 50, fluid may be pumped into or out of pocket 24. When fluid is pumped into pocket 24, the static pressure of the fluid inside of pocket 24 will increase. This increase in static pressure will place wall 30 in tension as it tries to contain the increased static pressure caused by the additional fluid. Convolutions 48 will unfold under the increasing static pressure of the fluid inside of pocket 34. This unfolding of convolutions 48, in turn, will permit inflatable bladder 20 to expand in the longitudinal direction.

Figure 6:
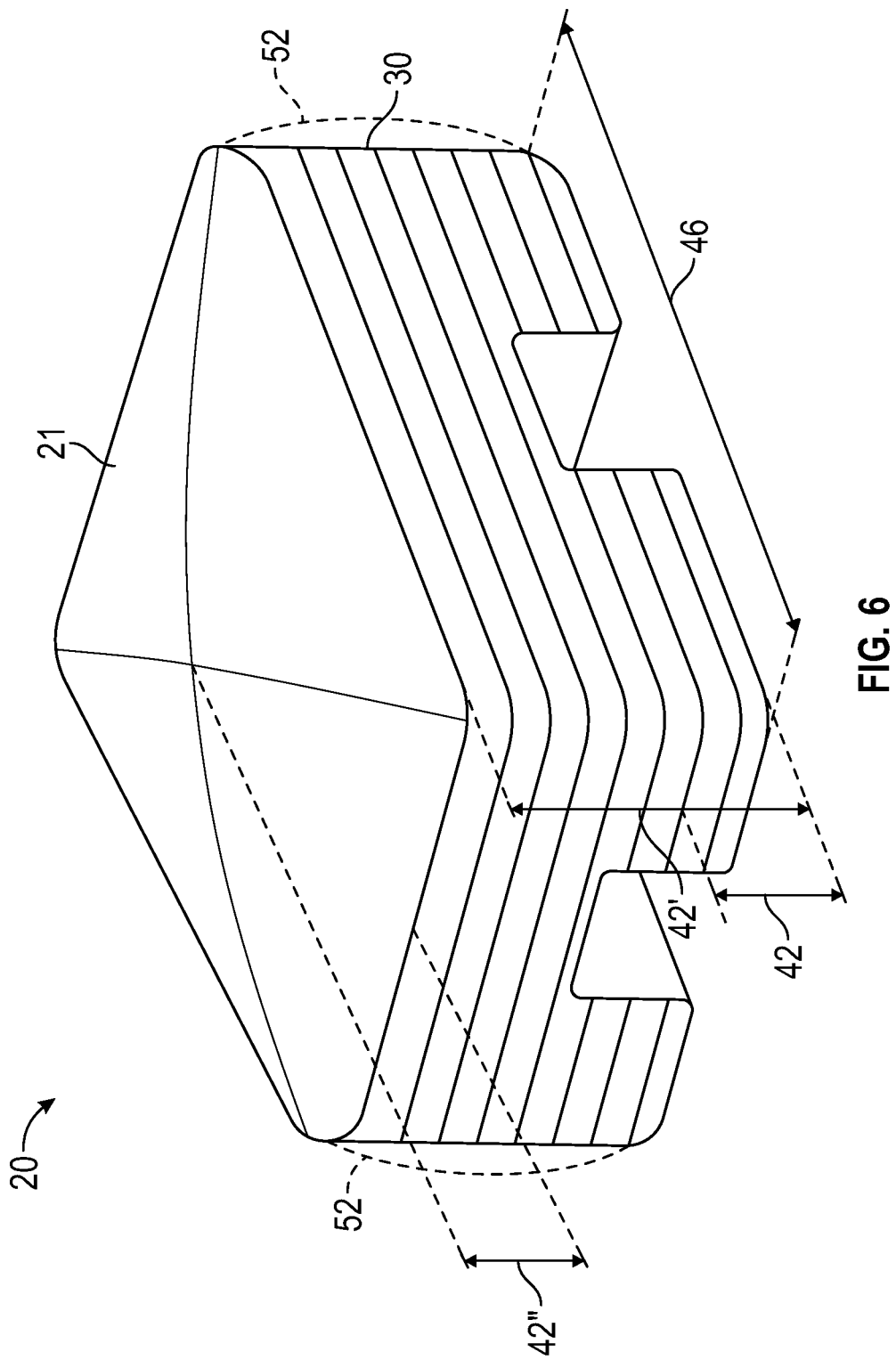
FIG. 6 is a perspective view illustrating the inflatable bladder of FIG. 3 in an inflated state.

With continuing reference to FIGS. 1-5, FIG. 6 is a perspective view illustrating inflatable bladder 20 in an expanded state. As illustrated in FIG. 6, the longitudinal dimension of inflatable bladder 20 has increased substantially. Longitudinal dimension 42' reflects the elongated longitudinal dimension of a vertical side of wall 30 of inflatable bladder 20 after inflatable bladder 20 has been inflated. For the purposes of comparison, also presented in FIG. 6 is longitudinal dimension 42. Longitudinal dimension 42 reflects the longitudinal dimension of that same vertical side of wall 30 measured when inflatable bladder 20 was in a deflated stated.

In addition to the longitudinal growth of the vertical side portion of wall 30, discussed above, upper surface 21 also protrudes in a convex manner and takes on a dome-like configuration when inflatable bladder 20 is inflated. This dome-like configuration protrudes in the longitudinal direction and further adds longitudinal dimension 42" to the overall longitudinal dimension of inflatable bladder 20 when inflated.

As discussed above, inflatable bladder 20 does not include any convolutions or expansion joints or any other mechanism to facilitate expansion of inflatable bladder 20 in the lateral direction. However, in some embodiments, owing to the nature of the material from which inflatable bladder 20 is constructed, there may be some bowing out of the vertical side portions of wall 30 in the lateral direction resulting in an expansion of lateral dimension 46 of inflatable bladder 20. This is reflected in FIG. 6 with phantom lines 52 which reflect a possible contour of the side portions of wall 30 when inflatable bladder 20 is inflated. This expansion of lateral dimension 46 is negligible in comparison with the growth of longitudinal dimension 42 resulting from the inflation of inflatable bladder 20.

With continuing reference to FIGS. 1-6, FIG. 7 is a cross-sectional view taken along the line 5-5 of FIG. 3 illustrating inflatable bladder 20 in an expanded state. As illustrated, when fully inflated, convolutions 48 (best seen in FIG. 3) have stretched and unfolded such that they are completely extended and pulled taut. In FIG. 7, opening 50 has been illustrated in an open state. It should be understood that in an actual functioning embodiment, opening 50 would be fluidly coupled with a tube 24 and/or with a valve 28. Valve 28, when closed, would inhibit any fluid in pocket 34 from exiting and it would also inhibit any additional fluid from entering into pocket 34. In some embodiments, valve 28 may be configured to permit fluid to egress from pocket 34 when the static pressure of the fluid in pocket 34 reaches or exceeds a predetermined threshold. In this manner, valve 28 may serve as a relieve valve to inhibit inflatable bladder 20 for rupturing.

As discussed above, depending upon the material used in the construction of inflatable bladder 20, the vertical side portions of wall 30 may expand under the increased internal static pressure. This expansion is indicated in FIG. 7 by phantom lines 52.

Figure 8:
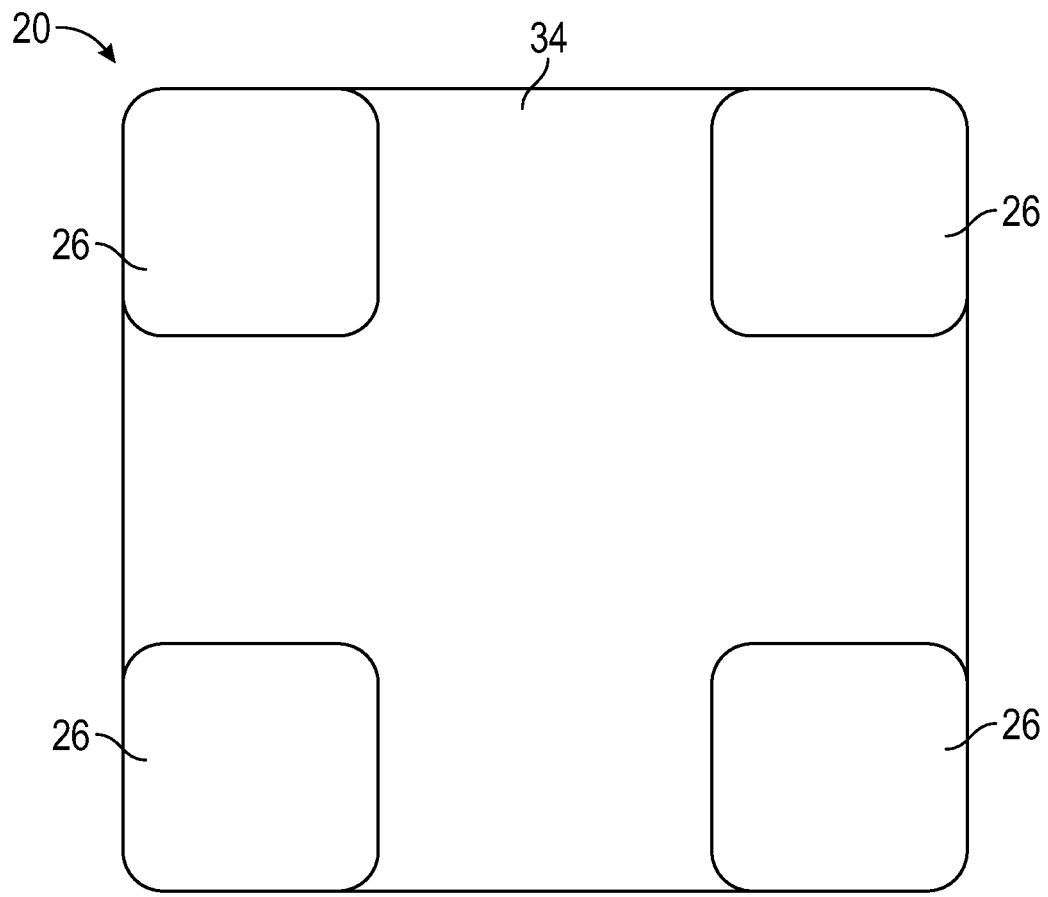
FIG. 8 is a cross-sectional view of the inflatable bladder of FIG. 3 taken along an imaginary horizontal plane extending laterally through the inflatable bladder.

With continuing reference to FIGS. 1-7, FIG. 8 is a cross-sectional view of inflatable bladder 20 taken along imaginary plane 44. The perspective illustrated in FIG. 8 is a top-down perspective, looking down into pocket 34 from above. In this illustration, the hollow configuration of feet 26 are clearly visible. In the illustrated embodiment, feet 26 are fluidly coupled with pocket 34 and, in this manner, comprise a portion of pocket 34. In the embodiment depicted in FIGS. 1-8, convolutions 48 are incorporated into the portion of wall 30 defining feet 26. Accordingly, feet 26 will expand longitudinally when inflatable bladder 20 is inflated.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the disclosure as set forth in the appended claims.

What is claimed is:

1. An inflatable bladder comprising:
   a bladder body having a wall, a longitudinal dimension, and a lateral dimension, wherein:
   the wall defines an interior volume enclosing a fluid when the inflatable bladder is deflated, and further defines an opening in fluid communication with the interior volume,
   the bladder body is fluid tight when the opening is closed,
   the wall is configured to facilitate an expansion of the longitudinal dimension during an ingress of the fluid into the interior volume and a contraction of the longitudinal dimension during an egress of the fluid from the interior volume, and
   the wall is further configured to maintain a constant lateral dimension during the ingress of the fluid into the interior volume and a constant lateral dimension during the egress of the fluid from the interior volume,
   wherein the bladder body further includes a plurality of feet disposed on an underside of the bladder body, the plurality of feet configured to stand-off a portion of the bladder body from a surface supporting the inflatable bladder.

2. The inflatable bladder of claim 1, wherein the bladder body has a generally rectangular configuration in a lateral cross-section.

3. The inflatable bladder of claim 2, wherein the bladder body has a rounded rectangular configuration in the lateral cross-section.

4. The inflatable bladder of claim 2, wherein the bladder body has a rounded square configuration in the lateral cross-section.

5. The inflatable bladder of claim 1, wherein an upper surface of the bladder body is flat when a static pressure of the fluid in the interior volume is equal to an ambient pressure outside of the bladder body, and wherein the upper surface is convex when the static pressure of the interior volume exceeds the ambient pressure outside of the bladder body.

6. The inflatable bladder of claim 1, wherein the plurality of feet are hollow and wherein a hollow portion of each foot of the plurality of feet is in fluid communication with the interior volume of the bladder body.

7. The inflatable bladder of claim 1, wherein the wall includes an expansion joint disposed around a periphery of the bladder body, the expansion joint configured to permit expansion of the longitudinal dimension of the bladder body.

8. The inflatable bladder of claim 7, wherein the expansion joint is disposed around an entire periphery of the bladder body.

9. The inflatable bladder of claim 7, wherein the expansion joint is aligned with an imaginary horizontal plane extending laterally through the bladder body.

10. The inflatable bladder of claim 7, wherein the expansion joint comprises a plurality of convolutes configured to facilitate an accordion-like expansion and contraction of the bladder body in a longitudinal direction.

11. The inflatable bladder of claim 1, wherein the longitudinal dimension exceeds 0.5 inches when a static pressure of the fluid is equal to an ambient pressure outside of the bladder body.

12. The inflatable bladder of claim 1, wherein the longitudinal dimension exceeds 1.0 inches when the static pressure of the fluid is equal to an ambient pressure outside of the bladder body.

13. The inflatable bladder of claim 1, wherein the bladder body resists contraction of the longitudinal dimension in response to an application of a compressive force exerted in a longitudinal direction when the opening is closed.

14. The inflatable bladder of claim 13, wherein the bladder body is configured to resist contraction of the longitudinal dimension in response to the application of the compressive force exerted in the longitudinal direction when the opening is closed and when a static pressure of the fluid is equal to an ambient pressure outside of the bladder body.

15. The inflatable bladder of claim 1, wherein all inner surfaces of the wall are spaced apart from all oppositely disposed inner surfaces of the wall when the opening is closed and when the static pressure of the fluid is equal to an ambient pressure outside of the bladder body.

16. An inflatable bladder comprising:
a bladder body having a wall, a longitudinal dimension, and a lateral dimension, wherein:
the wall defines an interior volume enclosing a fluid when the inflatable bladder is deflated, and further defines an opening in fluid communication with the interior volume,
the bladder body is fluid tight when the opening is closed,
the wall is configured to facilitate an expansion of the longitudinal dimension during an ingress of the fluid into the interior volume and a contraction of the longitudinal dimension during an egress of the fluid from the interior volume, and
the wall is further configured to constrain expansion of the lateral dimension during the ingress of the fluid into the interior volume such that any expansion of the lateral dimension is equal to, or less than, five percent of the expansion of the longitudinal dimension during the ingress of the fluid into the interior volume,
wherein the bladder body further includes a plurality of feet disposed on an underside of the bladder body, the plurality of feet configured to stand-off a portion of the bladder body from a surface supporting the inflatable bladder.

17. The inflatable bladder of claim 16, wherein all inner surfaces of the wall are spaced apart from all oppositely disposed inner surfaces of the wall when the opening is closed and when the static pressure of the fluid is equal to an ambient pressure outside of the bladder body.

18. The inflatable bladder of claim 16, wherein an upper surface of the bladder body is flat when a static pressure of the fluid in the interior volume is equal to an ambient pressure outside of the bladder body, and wherein the upper surface is convex when the static pressure of the interior volume exceeds the ambient pressure outside of the bladder body.

19. The inflatable bladder of claim 16, wherein the wall includes an expansion joint disposed around a periphery of the bladder body, the expansion joint configured to permit expansion of the longitudinal dimension of the bladder body.

* * * * *